Patented Feb. 20, 1940

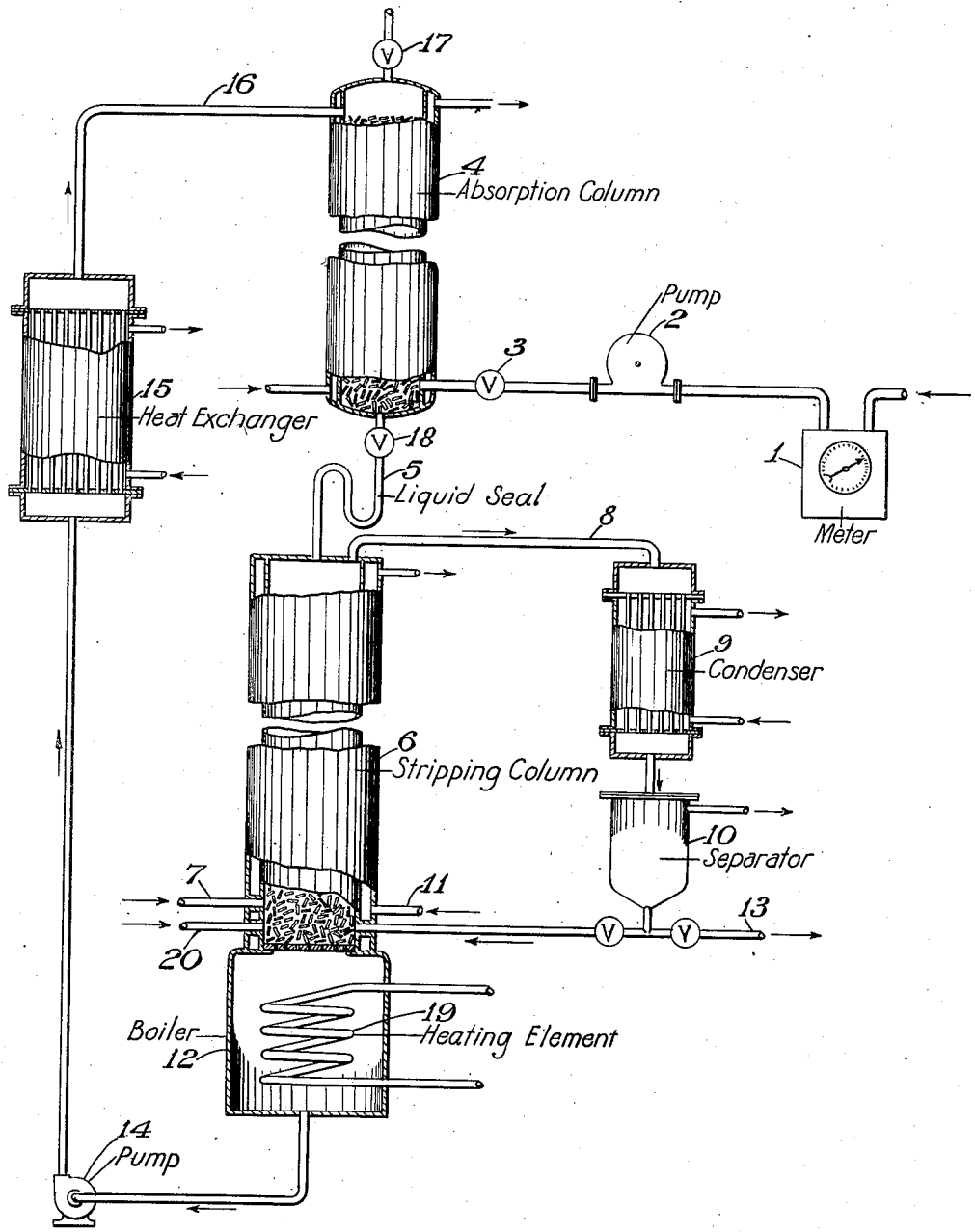

2,191,068

UNITED STATES PATENT OFFICE 2,191,068

PROCESS FOR PREPARING MONOVINYL-ACETYLENE

Albert S. Carter, Wilmington, Del., and Frederick B. Downing, Carneys Point, N. J., assignors to E. I. du Pont de Nemours & Company, Wilmington, Del., a corporation of Delaware Application May 8, 1936, Serial No. 78,584

12 Claims. (Cl. 260—678)

This invention relates to a method for the continuous production of monovinylacetylene. More particularly it relates to an improvement in the known processes for the catalytic production of monovinylacetylene from acetylene.

This application is a continuation-in-part of an application of Carter and Downing filed May 21, 1931, and given Serial Number 538,920, now Patent No. 2,048,838, dated July 28, 1936. As described in that application, it has been found that improved yields of monovinylacetylene are obtained if the monovinylacetylene is removed from the catalyst zone before substantial amounts of divinylacetylene are formed. A preferred method for carrying out the invention was disclosed to involve passing the acetylene over the catalyst solution at such a rate that little or no divinylacetylene was formed, then separating the monovinylacetylene from the effluent gases and thereafter returning the unreacted acetylene into the process. It was also disclosed, however, that the improvement could be applied to other known methods for the catalytic production of monovinylacetylene, for example, that method in which a body of the catalyst is charged with acetylene, then allowed to age for a short period and thereafter stripped of the acetylene and reaction products. It was also disclosed that this catalyst, after stripping, could be re-used.

It is an object of this invention to provide an improved process for catalytically producing monovinylacetylene from acetylene. A further object is to provide a process of this type in which high yields of monovinylacetylene are obtained with little loss to divinylacetylene and higher polymers. A further object is to provide a process in which the cycle of absorption in the catalyst and catalyst regeneration is repeated in a continuous manner, at such a rate that the process may be completed with a short aging period for the charged catalyst which will minimize the formation of divinylacetylene. Other objects will appear hereinafter.

As has been disclosed in the above identified copending application, the quantity of vinylacetylene produced relative to the quantity of divinylacetylene produced increases as the period of aging of the catalyst decreases. It is therefore possible to provide a predetermined ratio of vinylacetylene to divinylacetylene by charging the catalyst and liberating the products by distillation on a cycle properly chosen.

It has thus been found that the above objects may be accomplished by establishing a cycle of operation involving the steps of charging with acetylene a body of a catalyst capable of promoting the polymerization of acetylene to non-benzenoid polymers of acetylene, aging the charged catalyst for a period of time sufficient to permit the formation of substantial quantities of vinylacetylene but not sufficient to permit the formation of substantial quantities of divinylacetylene, then regenerating the catalyst by separating the reaction products and unreacted acetylene from it and thereafter recharging the regenerated catalyst with acetylene. It is obvious that this cycle can be rendered continuous by continuously circulating the charged catalyst from the absorption vessel to the vessel in which regeneration is carried out and then back to the absorption vessel again, the rate of circulation being adjusted so as to provide a predetermined aging time calculated to produce the desired ratio of vinylacetylene to divinylacetylene. The unreacted acetylene is separated from the reaction products and returned to the acetylene source and the vinylacetylene is recovered from the reaction products and purified as desired.

The operation may, for example, be accomplished in the apparatus shown in the accompanying diagram in which acetylene is introduced from storage through a meter 1, a pump 2, and a regulating valve 3 into a jacketed copper absorption column 4, eight inches in diameter by twelve feet long. In the apparatus shown 4 is a column packed with rings through which catalyst is circulated leaving through regulating valve 18 and liquid seal 5 and entering the jacketed regeneration equipment 6. At any time if the absorber becomes blanketed with inert gas from impurities in the acetylene, the inert gas may be vented off through line 17. In regeneration equipment 6, which is eight inches in diameter by fifteen feet long and which is also packed with rings, the catalyst flows counter-current to a stream of superheated steam entering through line 7 and leaving through line 8 carrying with it the products of the reaction from which water is condensed in cooler 9 and separated in vessel 10. The products of the reaction are removed as gases from vessel 10 and are subjected to further purification, while the necessary part of the water condensed from the steam and vaporized from the catalyst is returned through line 11 to the circulating catalyst.

Attached in a suitable manner to the bottom of the regenerating vessel 6 is a boiler 12 which is provided with heating means 19, such as a steam coil or electrical heater, to maintain the catalyst temperature and to assist in stripping the catalyst of acetylene and reaction products. The use of excessive quantities of steam for this purpose can thus be avoided and the composition of the catalyst maintained more nearly constant. Line 20 is attached to the regenerating vessel to provide means for introducing water into the catalyst, if desired.

The composition of the catalyst is maintained constant by periodic analysis of the catalyst liquor accumulating in the boiler 12 at the bottom of the regeneration equipment. If excess water accumulates it is withdrawn from the separator through line 13. Regenerated catalyst is circulated by means of pump 14 through a heat exchanger 15, adjusted to maintain the catalyst at the proper absorption temperature and introduced into the absorption column through line 16.

In the operation of this equipment a continuous flow of catalyst is maintained through vessels 4, 6 and 15, at such a rate that the aging time between absorption in vessel 4 and liberation in vessel 6 provides a suitable reaction period such that acetylene is converted to vinylacetylene without substantial amounts of divinylacetylene being formed. Thus, acetylene is introduced into 4, where it is absorbed by the catalyst and carried to 6 and at the same time partially converted to vinylacetylene and divinylacetylene, the acetylene and reaction products being separated from the catalyst in 6 and passed through 8 and 9 into 10 from which the acetylene and reaction products are recovered. The unreacted acetylene may be separated from the reaction products by known means, for example, distillation, and again introduced into the process through meter 1 and pump 2. As is disclosed in the copending application, it is highly desirable to thoroughly strip the unreacted acetylene of vinylacetylene before returning the unreacted acetylene to the process for the reason that vinylacetylene returned into the process tends to increase the production of higher polymers.

Thus, it will be obvious that the process of this invention consists merely in a specific method for attaining the objects of the copending application. It is therefore possible to modify the present invention in substantially the manner described in the copending Carter and Downing application referred to above. The features which characterize the continuous process described herein are adapted from the aging step described in the copending application and are an obvious result derived from the theoretical consideration presented in that application showing that the formation of vinylacetylene and divinylacetylene are consecutive reactions both occurring in the catalyst medium as a function of aging time and that, therefore, control of their formation may be attained by removing the reaction products from the catalyst at a predetermined time after the acetylene is introduced. This continuous process obviously involves merely continuously repeating the steps of the batch process disclosed in the copending application.

The operation of the equipment described above is more fully illustrated by the following example.

Example

The apparatus described above is prepared for operation by introducing into the boiler 12 a catalyst comprising an acid aqueous solution of cuprous chloride and ammonium chloride in an amount sufficient to provide adequate circulation throughout the system (approximately 20 gallons). The catalyst was circulated by pump 14 at a rate of 2 gal. per minute and the control valve 18 was set to maintain catalyst hold-up in the seal 5 and absorption vessel 4. This catalyst hold-up determines the aging time and is ultimately adjusted to obtain the desired monovinylacetylene/divinylacetylene ratio in the reaction products. This hold-up cannot be predicted with certainty until the hold-up of the column packing is known and, therefore, should be adjusted to give the desired products.

Steam flow to regeneration equipment 6 and the jacket on the regeneration column was adjusted so that the catalyst was brought to the boiling point (about 110° C.). Water supplied to the cooler, 15, and the jacket of column 4 was adjusted so that the temperature of the liquor flowing through the seal 5 was 65°–75° C. Pure acetylene at a pressure of approximately 1 atmosphere absolute was admitted near the bottom of the column as rapidly as absorbed (approximately 75 pounds per hour). Shortly after first contacting acetylene with the catalyst, the vapors which were liberated in column 6 were analyzed and the absorber hold-up adjusted until the analysis after drying was found to be approximately 85% acetylene, 11% vinylacetylene, less than 1% acetaldehyde and less than 1% higher boiling organic matter, by volume. This analysis corresponds to a 20–25% conversion of input acetylene to vinylacetylene. Heat was supplied to boiler 12 and jacket of column 6 at a rate sufficient to free the catalyst of all organic matter as evidenced by the absence of tar-like material in the catalyst as it left the boiler. From time to time inert gases accumulated in column 4 were vented through opening 17. The specific gravity of the catalyst was controlled by adding or removing water in the system.

Water was condensed from the products liberated from the catalyst by refrigeration in 9 and separated in vessel 10. Gaseous products from 10 were dried and charged into a low temperature distilling column from which unreacted acetylene was discharged at the top through a suitable reflux condenser and introduced again into column 4 for further reaction. Vinylacetylene and divinylacetylene were discharged from the bottom of this recovery column and separated by fractional distillation.

As disclosed in the copending application, this reaction may be conveniently carried out at any temperature between ordinary temperature and the boiling point of the catalyst, approximately 110° C. At lower temperatures, absorption is more rapid and conversion to reaction products slower than obtained at higher temperatures. The effect of high absorption at low temperature is partially offset by lower reaction rate. Therefore, we prefer an intermediate operating range, for example, 40–75° C. but operation above or below this range may be readily accomplished.

As described in the copending application, in carrying out the present process any catalyst may be used which is capable of promoting the polymerization of acetylene to non-benzenoid hydrocarbons. Catalysts which have been found to be especially adapted to this end consist in solutions of cuprous salts in an aqueous solution of a salt of ammonia or a salt of a tertiary amine, which solution has an acidity of not less than that represented by a hydrogen ion concentration of pH 6, this hydrogen ion concentration being readily established by the normal hydrolysis of a strong ammonium chloride solution without the necessity of additional added acid.

Non-alkalinity may be established or maintained by the addition of an inorganic acid which does not render the cuprous salt insoluble, such as HCl, but such acid addition should preferably not supply ionizable hydrogen in excess of the quantity equivalent to 0.2% of the cuprous copper present. As in the copending application catalysts of this type may be prepared from cuprous salts and ammonium salts or tertiary amines as described by Nieuwland, U. S. Patent 1,811,959, and it may contain also an added acid constituent as described by Nieuwland, U. S. Patent 1,926,056, or as described by Nieuwland and Vogt, U. S. Patent 1,926,055, or it may be of essentially the same non-alkaline character but prepared by the process described in Perkins, U. S. Patent 1,971,656.

The rate of conversion of the acetylene to non-benzenoid polymers is independent of the rate of circulation of the catalyst but the degree of conversion is not independent and therefore, at slow rates with a given equipment the reaction will go farther and the ratio of products will be higher in divinylacetylene. The rate of circulation will also depend upon the size of the apparatus used. It is desirable to have the catalyst circulation sufficiently great to maintain the packing in the absorption column and stripping column wet with catalyst but the rate should not be sufficiently great to flood these columns. Excessive rates are also undesirable because they are thermally inefficient. With any chosen circulation rate, a suitable volume of catalyst may be introduced to maintain the proper aging time and permit a surplus to remain in the bottom of the regenerating (stripping) column. A rate suited to equipment of the proportions defined above has been given in the example. This will serve to illustrate the application of the principles outlined above.

Acetylene may be passed into the absorption column anywhere along its length, but it is desirable to install a vent for the removal of inert gas at a point as far removed from the introduction of acetylene as possible. Preferably, however, the acetylene will be passed into the absorption column at the bottom and the vent for inert gases will be placed at the top of the column as shown on the accompanying drawing.

The operating pressure of acetylene on the absorption column is limited only by the hazards involved in maintaining high pressure on acetylene, particularly at elevated temperatures. According to well-known physical laws, the absorptive capacity of the catalyst increases as a function of pressure. This increased absorption in the catalyst liquor provides a corresponding increase in production per unit weight of catalyst.

In the example, above, stripping by means of superheated steam has been described as a preferred method. However, its equivalents are obviously applicable, for instance, stripping by means of heat alone or by distillation under reduced pressure or by blowing through the catalyst solution with gases or vapors other than steam. The advantages of lowered production of higher polymers make thorough stripping very desirable and preferably, therefore, the stripping will be so carried out as to remove substantially all of the reaction products during the passage of the catalyst through the regeneration column.

Thus, a process is provided from the elements disclosed in the copending Carter and Downing application for the continuous preparation of acetylene polymerization products by means of catalytically active acid cuprous salt solutions consisting in passing acetylene gas into a cuprous salt solution and before considerable quantities have been converted to divinylacetylene, continuously removing the cuprous salt solution from the absorption apparatus and introducing it into regenerating apparatus, separating the polymerization products obtained from the gaseous mixture which escapes from the regenerating apparatus, the cuprous salt solution being restored to the cycle.

It is apparent that many widely different embodiments of this invention may be made without departing from the spirit and scope thereof and therefore it is not intended to be limited except as indicated in the appended claims.

We claim:

1. In a process for the production of monovinylacetylene, the steps which comprise continuously dissolving acetylene in an absorption vessel in a body of a liquid catalyst capable of promoting the polymerization of acetylene to non-benzenoid polymers of acetylene, continuously withdrawing said body of catalyst from said absorption vessel at such a rate that a portion of the acetylene reacts to form vinylacetylene without the formation of substantial amounts of divinylacetylene, continuously discharging from the catalyst withdrawn the reaction products and absorbed acetylene, and continuously returning the regenerated catalyst to the absorption vessel.

2. The process of claim 1, further characterized in that the catalyst is an acid solution comprising a cuprous salt and a salt of the class consisting of ammonium salts and salts of tertiary amines.

3. The process of claim 1, further characterized in that the acetylene is absorbed in the catalyst under super-atmospheric pressure.

4. The process of claim 1, further characterized in that the catalyst entering the absorption vessel is substantially completely free of acetylene and reaction products thereof.

5. The process of claim 1, further characterized in that the temperature is adjusted so that the catalyst as withdrawn from the absorption vessel has a temperature in the range of 40° to 75° C.

6. A process for the production of monovinylacetylene, which comprises continuously circulating an aqueous acid cuprous chloride catalyst in a system in which it passes into an absorption vessel, then into a stripping vessel and then back to the absorption vessel, the catalyst being charged with acetylene in the absorption vessel and stripped of acetylene and its reaction products in the stripping vessel, the rate of circulation being sufficiently slow to permit the formation of substantial amounts of vinylacetylene but not sufficiently slow to permit the formation of substantial amounts of divinylacetylene.

7. The process of claim 6, further characterized in that the temperature of the catalyst leaving the absorption vessel is 40° to 75° C.

8. The process of claim 6, further characterized in that the catalyst entering the absorption vessel is substantially completely free of acetylene and reaction products thereof.

9. The process of claim 6, in which the catalyst leaving the absorption vessel has a temperature of 40° to 75° C. and in which the catalyst in the stripping vessel is heated to about 110° C. by means of a hot gas passed counter-current to the catalyst through the stripping vessel.

10. A process as described in claim 1, further characterized in that the unreacted acetylene stripped from the catalyst is separated from the reaction products and returned to the acetylene source.

11. A process as described in claim 1, further characterized in that the unreacted acetylene stripped from the catalyst is separated from the reaction products and returned to the acetylene source.

12. In a process for the continuous production of monovinylacetylene, the steps which comprise circulating through a system a liquid catalyst capable of promoting the polymerization of acetylene to non-benzenoid polymers, at one point in said system charging said catalyst with acetylene and at another point in said system stripping the catalyst of acetylene and reaction products, the rate of circulation between said points being so controlled that the acetylene reacts to form a substantial quantity of monovinylacetylene without the formation of substantial quantities of divinylacetylene.

ALBERT S. CARTER.
FREDERICK B. DOWNING.

CERTIFICATE OF CORRECTION.

Patent No. 2,191,068. February 20, 1940.

ALBERT S. CARTER, ET AL.

It is hereby certified that error appears in the printed specification of the above numbered patent requiring correction as follows: Page 4, first column, line 8, claim 11, for the claim reference numeral "1" read 6; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.